United States Patent [19]
Wallis

[11] Patent Number: 5,363,737
[45] Date of Patent: Nov. 15, 1994

[54] AIR-VEHICLE LAUNCHER APPARATUS

[75] Inventor: Graham Wallis, Stevenage, England

[73] Assignee: British Aerospace Public Limited Company, Hampshire, England

[21] Appl. No.: 35,216

[22] Filed: Mar. 22, 1993

[30] Foreign Application Priority Data

Mar. 27, 1992 [GB] United Kingdom ................. 9206756

[51] Int. Cl.⁵ .......................... F41F 3/06; B64D 1/04
[52] U.S. Cl. .................... 89/1.54; 89/1.819; 244/137.4
[58] Field of Search ...................... 244/137.4; 89/1.51, 89/1.58, 1.59, 1.8, 1.806, 1.819; 102/393

[56] References Cited

U.S. PATENT DOCUMENTS

| | | | |
|---|---|---|---|
| 2,865,584 | 12/1958 | Holloway | 89/1.51 |
| 3,276,367 | 10/1966 | Edwards | 102/393 |
| 3,561,705 | 2/1971 | Daughenbaugh | 244/138 |
| 3,980,019 | 9/1976 | Anderson et al. | 102/393 |
| 4,333,382 | 6/1982 | Holt et al. | 89/1.806 |
| 4,352,314 | 10/1982 | Engel et al. | 89/1.5 |
| 4,447,025 | 5/1984 | Bock et al. | 244/137.4 |
| 4,473,200 | 9/1984 | Deady | 244/137.4 |
| 4,638,736 | 1/1987 | Farmer | 102/393 |
| 4,660,456 | 4/1987 | Griffin et al. | 89/1.819 |
| 4,745,840 | 5/1988 | Long | 89/1.8 |
| 4,829,878 | 5/1989 | Thompson | 244/137.4 |
| 4,856,409 | 8/1989 | Bowden | 89/1.819 |
| 4,911,059 | 3/1990 | Broeckner | 89/1.819 |

FOREIGN PATENT DOCUMENTS

| | | |
|---|---|---|
| 136917 | 4/1985 | European Pat. Off. |
| 247712 | 12/1987 | European Pat. Off. |
| 268474 | 4/1990 | European Pat. Off. |
| 793927 | 4/1958 | United Kingdom |
| 1540618 | 2/1979 | United Kingdom |

*Primary Examiner*—David Brown
*Attorney, Agent, or Firm*—Cushman Darby & Cushman

[57] ABSTRACT

A jettisonable adaptor for air-carried missiles is located between an aircraft-mounted launcher and a missile. The adaptor may include flight stabilization and retardation functions which are deployable on separation from the launcher. Instead of mounting fixing hooks on the missile (which would incur aerodynamic-drag) these are mounted on the adaptor instead. When stabilization has occurred the adaptor is separated from the missile.

4 Claims, 2 Drawing Sheets

AIR-VEHICLE LAUNCHER APPARATUS

FIELD OF THE INVENTION

This invention relates to air-vehicles and launcher apparatus therefor and particularly to missiles or drones and the like carried by and launched from an aircraft.

BACKGROUND OF THE RELATED ART

Some air-launched missiles (or bombs) are provided with a series of upstanding lugs which engage with an aircraft-mounted launcher. On launch, the missile is pushed away from the launcher with the lugs remaining fixed to the missile body.

To achieve optimum performance, it is desirable to design missiles so they have low aerodynamic drag characteristics and a low radar cross-section. The presence of upstanding lugs on the missile then becomes a significant factor, reducing performance in both respects.

One solution to this problem is proposed in EP268474 in which means are provided for severing the hooks from the missile as it is launched.

Objects of this invention are to provide an alternative solution to the problem of the presence of said hooks, that solution in itself possessing further advantages over known arrangements.

Another problem known to those skilled in the art of missile and missile launcher design is that of ensuring stabilization of the missile once it has separated from the aircraft.

A further problem is that of designing the missile to be structurally strong enough to withstand the air carriage and launch-induced forces without incurring an unacceptable weight penalty.

SUMMARY OF THE INVENTION

The present invention proposes means for missile or drone separation which greatly reduce the magnitude of these problems.

The invention therefore consists of an adaptor for releasable attachment to an aircraft-mounted launcher and to an air vehicle, including means for releasing the air vehicle from the adaptor subsequent to release of the adaptor from the aircraft while in flight.

Thus, the air vehicle, which may comprise a missile is ejected from the aircraft with the adaptor attached. Following recovery from the launch transient the adaptor is jettisoned by the missile by suitable jettison means incorporated within the adaptor or the missile.

On the launcher side the adaptor may be attached using standard bomb lugs. On the missile side any suitable, releasable attachment means may be used.

The adaptor is preferably structurally designed to react the missile inertial and aerodynamic air carriage loads into the bomb lugs. If the missile attachments are distributed along the length of the missile, this may relieve to a greater or lesser extent the loads imparted into the missile structure.

If appropriate the adaptor can carry an aerodynamic empennage to enhance the natural aerodynamic stability to the missile/adaptor combination. The empennage may be deployable to meet geometrical constraints whilst on the aircraft, and may also include a retarding device to quicken the separation from the launch aircraft.

The adaptor may take the form of a hollow container in which the air vehicle is carried prior to launch.

The carriage and release of large missiles and drones from high speed aircraft at low level result in conflicting requirements.

To ensure safety of the launch aircraft, separation has to be clean and positive, even in the event of missile system failures. Thus the missile should be elected with a sufficient pitch down rate that it can under no circumstances pitch up and collide with the aircraft. On the other hand, if the missile is to be launched at low level it must recover from this pitch down election before it hits the ground. This requires either active control or a considerable natural aerodynamic stability margin. Active control during weapon release is undesirable because in modern weapons it means that almost all sub-systems and software become safety critical items with large reliability and cost penalties. A large natural aerodynamic stability margin results in a missile which is less maneuvrable in its free flight phase. It also requires a large empennage which is often precluded by aircraft and ground line geometry. One solution to the geometry problem is to have a deployable empennage; however since the empennage is required to be effective almost immediately after ejection very short deployment times are required. Moreover, the empennage is normally also used for flight controls, with the result that a very complicated fast acting mechanism is required.

The dilemma is solved in the invention by having separate, dedicated empennages for free flight control and for post launch stabilization and shedding the latter once safely clear of the aircraft. The stabilizing empennage design may then be optimized for rapid deployment.

The maneuver capabilities of known current launch platforms impose high air carriage loads on large missiles, which generally exceed those loads the missile will encounter in free flight. Consequently a good proportion of the structural mass is required only for the air carriage condition and is an unwelcome mass penalty on the free flight missile. The invention allows this extra structure to be shed after its purpose is accomplished.

Unless a special-to-type launcher can be provided on the aircraft, weapons have to be attached via standard bomb lugs. This has numerous disadvantages, some of which have already been described. The spacing of standard lugs is fixed and may not suit the missile structural layout. Whilst there is some tolerance in the allowable missile centre of gravity with respect to the lugs, it is seldom sufficient for development.

The invention relaxes all of these difficulties by allowing the weapon designer complete flexibility in the attachment devices on the free flight missile. The invention also allows the missile to be attached without modification itself to non standard launchers or in varying positions, merely by altering the lugs on the adaptor.

BRIEF DESCRIPTION OF THE DRAWINGS

Embodiments of the invention will now be described, by way of example only, with reference to the drawings of which.

DESCRIPTION OF PREFERRED EMBODIMENTS

Figure 1:
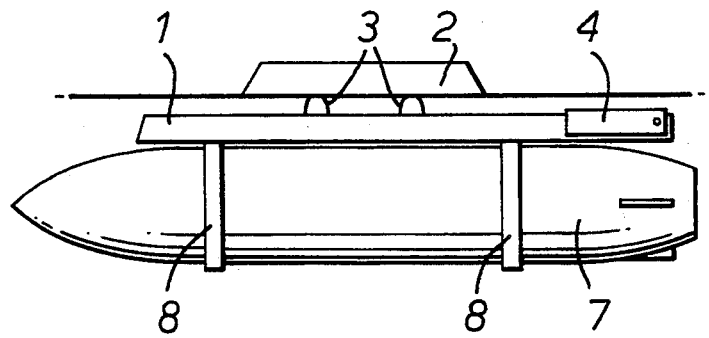
FIG. 1 is a schematic diagram showing means for launching a missile from an aircraft in accordance with the invention.

In FIG. 1 and 2(a) through 2(c) an adaptor 1 is attached to a launcher 2 by a series of attachment hooks 3. The launcher 2 is attached to the underside of an aircraft (not shown). The adaptor 1 is provided with an empennage 4 for stabilization purposes. Stowed inside the adaptor 1 is a deployable parachute 5 and jettison means 6.

A missile 7 is connected to the adaptor 1 by releasable straps 8 which are carried by the adaptor 1. The missile 7 is provided with deployable fins 9 for control purposes.

Figure 2A:
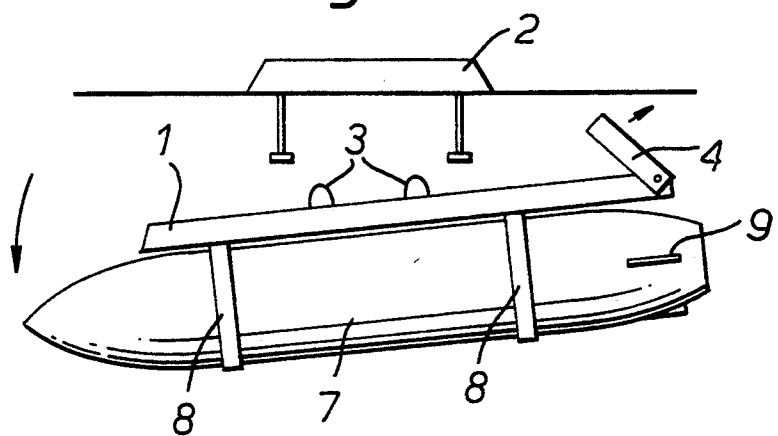
FIGS. 2(a), 2(b) and 2(c) are schematic diagrams showing the three stages of launch, stabilization and jettison respectively, of the missile/adaptor arrangement in accordance with the invention.
Figure 2B:
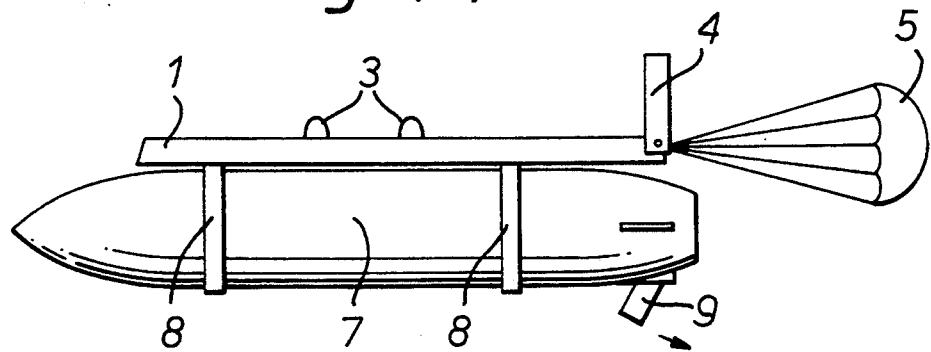
Figure 2C:
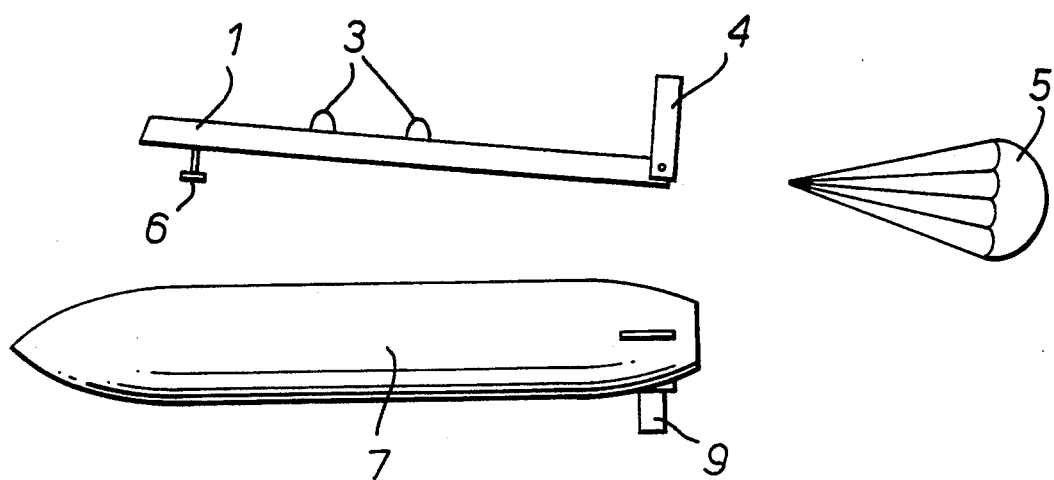

FIG. 2(a), 2(b) and 2(c) illustrate respectively ejection of the missile/adaptor assembly from the aircraft, stabilization of the missile/adaptor assembly and separation of the missile from the adaptor.

FIG. 2(a) shows how the missile, still attached to the adaptor adopts a pitch-down attitude whilst the adaptor's empennage 4 quickly deploys. The stowable fins 9 then begin to deploy.

In FIG. 2(b) the empennage 4 and the retarding parachute 5 are now fully deployed, thus stabilizing the flight of the missile 7 whilst its own fins 9 extend to their locked-out positions.

In FIG. 2(c) the adaptor and missile are separated by the action of the jettison means 6 possibly assisted by the parachute 5 and the missile continues to fly on towards a target.

Figure 3:
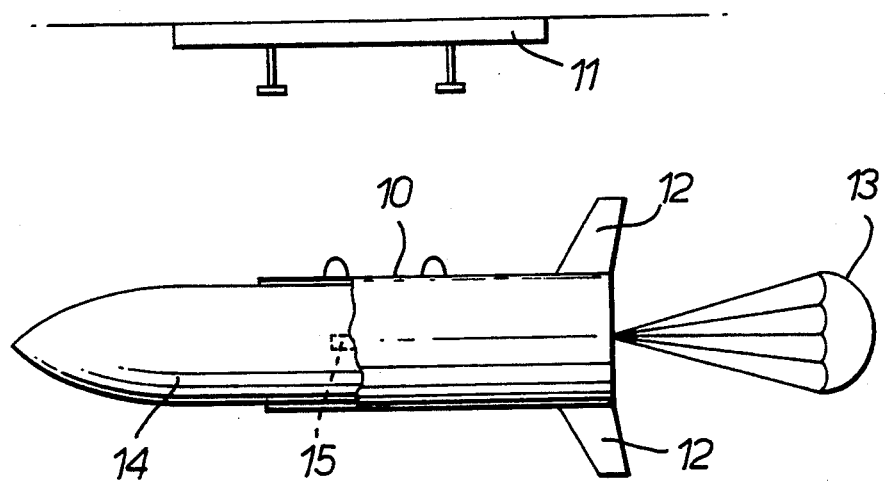
FIG. 3 is a schematic diagram of a missile being deployed from an alternative form of launch apparatus in accordance with the invention.

In the second embodiment of FIG. 3 an adapter 10 takes the form of a cylindrical container. The adapter 10 is releasably attached to an aircraft-carried launcher 11 and incorporates deployable empennages 12 and a retarding parachute 13 in common with the adapter 1 of the first embodiment. A missile 14 (or drone) is carried inside the adapter 10. After the adapter/missile combination has been released from the aircraft, the adapter 10 is jettisoned from the missile 14 by the action of the parachute 13 and jettison means 15 incorporated in the missile.

The second embodiment has the advantage of providing the missile or drone with a benign environment prior to its deployment.

Alternative embodiments may include further aerodynamic surfaces and/or bonker jets or thrusters in order to assist with stabilization immediately after launch. A pitch-down attitude may be encouraged, for example, by the provision of fixed or deployable surface, mounted towards the fore end of the adaptor.

I claim:

1. Air vehicle launching apparatus comprising an adaptor for releasable attachment to an aircraft-mounted launcher and to an air vehicle, including means for releasing the air vehicle from the adaptor subsequent to release of the adaptor from an aircraft while in flight, said adaptor being provided with a deployable, stabilizing empennage and flight retardation means.

2. Air vehicle launcher apparatus according to claim 1 in which said flight retardation means is connected to said empennage for deployment thereof.

3. Air vehicle launching apparatus comprising an adaptor for releasable attachment to an aircraft-mounted launcher and to an air vehicle, including:

means for releasing the air vehicle from the adaptor subsequent to release of the adaptor from an aircraft while in flight, said adaptor being provided with a deployable, stabilizing empennage; and a releasable strap for attaching an air vehicle thereto.

4. Air vehicle launching apparatus comprising an adaptor for releasable attachment to an aircraft-mounted launcher and to an air vehicle, including means for releasing the air vehicle from the adaptor subsequent to release of the adaptor from an aircraft while in flight, said adaptor being provided with a deployable, stabilizing empennage and said adaptor has a body, said body having the form of a hollow container.

* * * * *